(12) United States Patent
Fukuta et al.

(10) Patent No.: US 7,092,944 B2
(45) Date of Patent: Aug. 15, 2006

(54) PERSONAL INFORMATION MANAGEMENT APPARATUS, PERSONAL INFORMATION MANAGING METHOD, AND STORAGE MEDIUM AND PROGRAM THEREFOR

(75) Inventors: Shigeki Fukuta, Kawasaki (JP); Masanobu Yuhara, Kawasaki (JP); Takashi Nishigaya, Kawasaki (JP); Takao Mohri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 10/000,088

(22) Filed: Dec. 4, 2001

(65) Prior Publication Data

US 2002/0188609 A1 Dec. 12, 2002

(30) Foreign Application Priority Data

Jun. 8, 2001 (JP) ............................. 2001-174156

(51) Int. Cl.
 G06F 7/00 (2006.01)
 G06F 17/30 (2006.01)
(52) U.S. Cl. ........................................ 707/10; 707/201
(58) Field of Classification Search .................. 707/10, 707/3, 2, 6, 9
See application file for complete search history.

(56) References Cited

U.S. PATENT DOCUMENTS

| | | | | | |
|---|---|---|---|---|---|
| 5,873,108 | A | * | 2/1999 | Goyal et al. ................. | 715/507 |
| 5,920,858 | A | * | 7/1999 | Kitabayashi et al. ........... | 707/4 |
| 5,966,714 | A | * | 10/1999 | Huang et al. ................ | 707/201 |
| 6,202,060 | B1 | * | 3/2001 | Tran .............................. | 707/3 |
| 6,577,720 | B1 | * | 6/2003 | Sutter ...................... | 379/144.05 |
| 6,601,076 | B1 | * | 7/2003 | McCaw et al. ............. | 707/203 |
| 2002/0144289 | A1 | * | 10/2002 | Taguchi et al. ............. | 725/112 |
| 2002/0157014 | A1 | * | 10/2002 | Zhou ........................... | 713/200 |
| 2003/0018700 | A1 | * | 1/2003 | Giroti et al. ................. | 709/201 |
| 2003/0069874 | A1 | * | 4/2003 | Hertzog et al. ................ | 707/1 |

FOREIGN PATENT DOCUMENTS

JP     A-2000-67118     3/2000

* cited by examiner

*Primary Examiner*—Kuen S. Lu
(74) *Attorney, Agent, or Firm*—Staas & Halsey LLP

(57) ABSTRACT

A personal information management apparatus electronically manages users' personal information, and includes a personal information database selection unit and a processing unit. The personal information database selection unit selects a personal information database based on predetermined rules from a personal information storage unit including a plurality of personal information databases respectively storing personal information about different situations of a user. The processing unit processes the personal information database selected by the personal information database selection unit such that the personal information can be read and written. Thus, personal information about different situations can be easily and collectively managed.

37 Claims, 10 Drawing Sheets

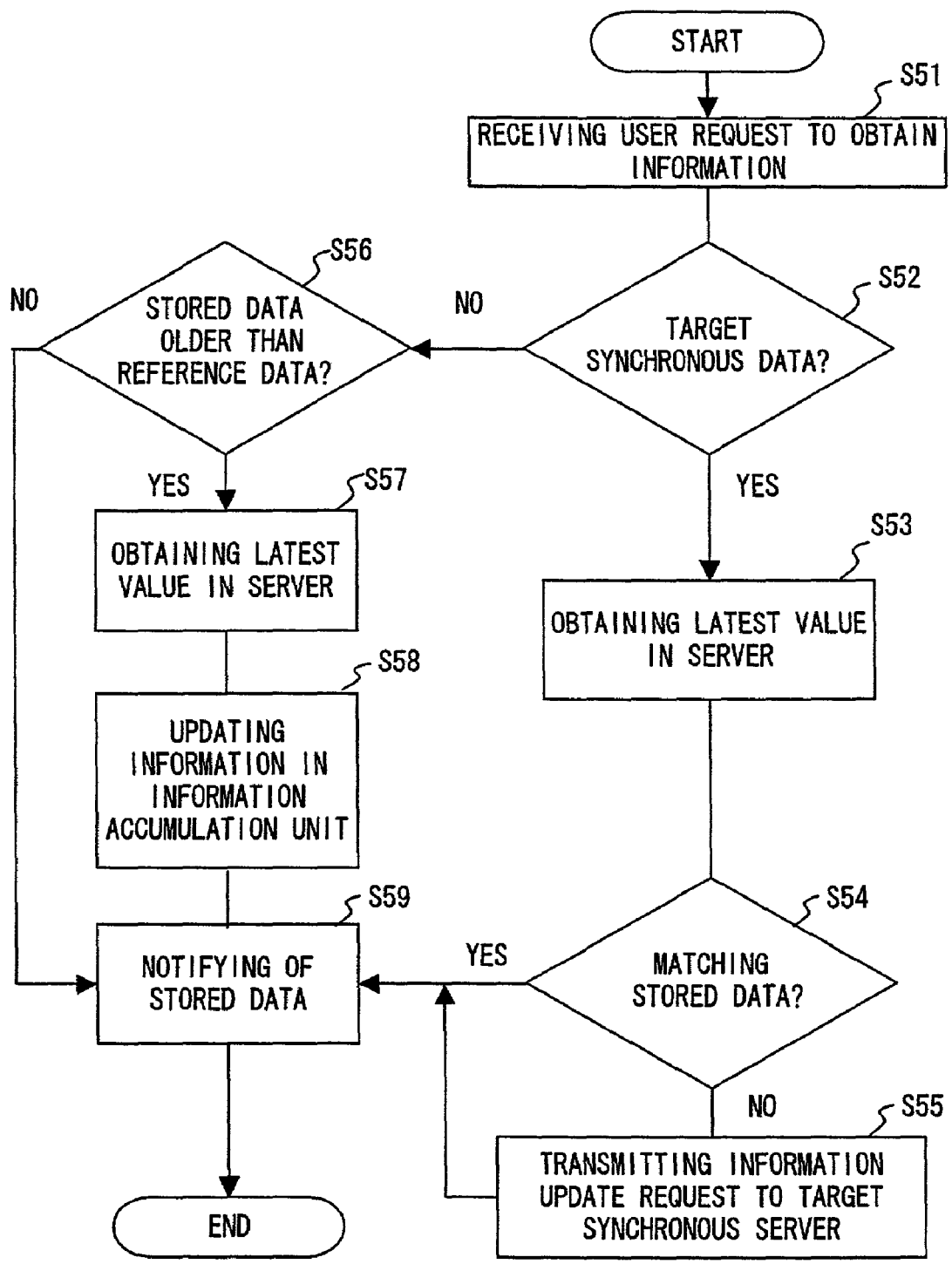
F I G. 5

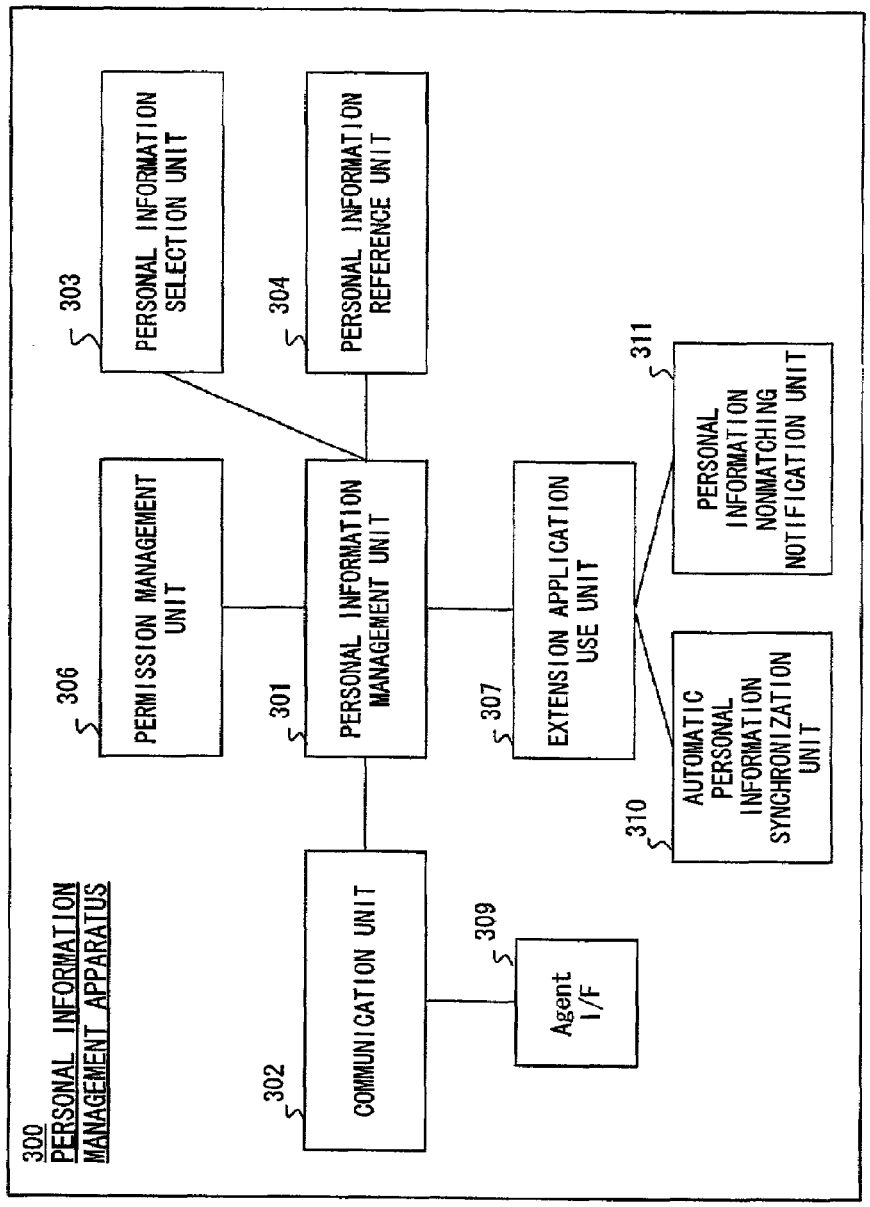
F I G. 7

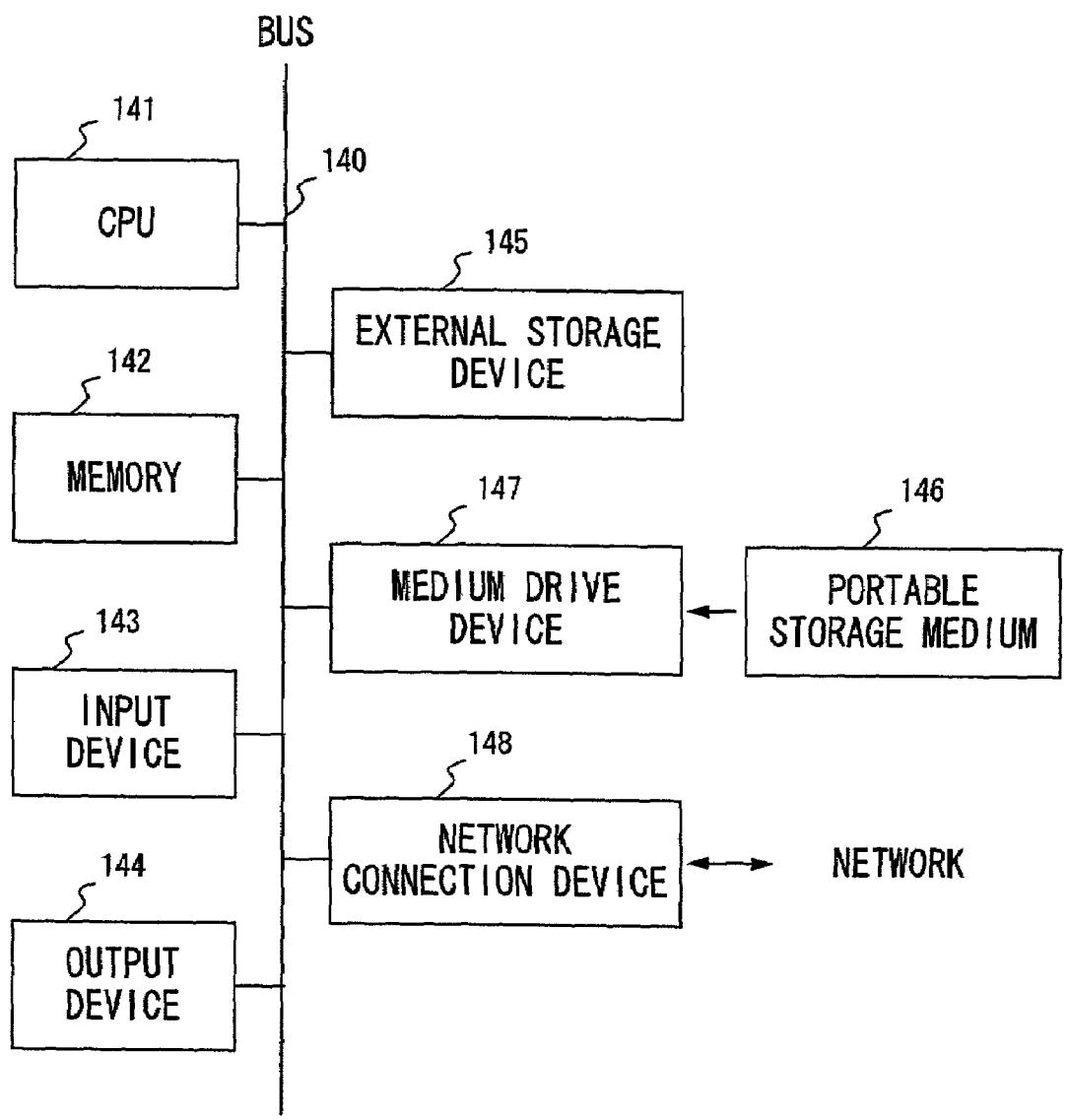
F I G. 9

PERSONAL INFORMATION MANAGEMENT APPARATUS, PERSONAL INFORMATION MANAGING METHOD, AND STORAGE MEDIUM AND PROGRAM THEREFOR

BACKGROUND OF THE INVENTION

1. Field of the Invention

The present invention relates to a personal information management apparatus and a personal information managing method for managing personal information, and a storage medium and a program therefor, and more specifically to a personal information management apparatus and a personal information managing method for managing personal information about a person by dividing the information into plural sets of different situations, and a storage medium and a program therefor.

2. Description of the Related Art

Recently, efficient management of personal information has become more and more important in daily life as well as in business. Personal information refers to, for example, common information such as an address book, telephone book, schedule information, etc. that have been managed on notebooks, and also to the bookmark of a WWW browser, and the option setting information, etc. for the OS or an application program.

The personal information has been increasing in volume and variation with the development and complexity of information processing appliances. A number of information terminals and management applications are being marketed at present, and the personal information management function has been installed in a portable telephone, etc. In addition, to utilize the personal information management in various requirements, personal information has also been accumulated in a server for access through a network.

However, personal information has been managed in a distribution system in various places, and users have found difficulty in appropriately obtaining personal information. To solve the problem, there have been several practical applications to collectively manage the personal information.

For example, an information terminal device is described in Japanese patent Publication No.2000-67118. The device receives a request to set a schedule between users using a schedule database for management of the schedule of an operator, and communication means for communication between the users, and has the function of reflecting a setting result on the schedule database of each user.

However, in the personal information management apparatus (personal agent) such as the above mentioned information terminal device, there has been the following problem in processing the personal information.

Users have respective status and situations in their offices, home, etc. Especially, mixing up private information with public information causes a problem of the business security, infringement of privacy, etc. Therefore, users have no alternative but to use a plurality of personal information management apparatus (personal agent) and manage the information as different persons.

On the other hand, in the method of processing information as completely different persons, all personal information has to be separately managed as each person who has set his or her own personal information, thereby failing in collectively managing the personal information which is the first object of the personal information management apparatus (personal agent) for managing the personal information.

The users request to classify the information to be managed by a plurality of personal information management apparatuses (personal agents) into an information group to be shared and another information group not to be shared so that the information to be shared can be equally accessed by any personal information management apparatus (personal agent).

Furthermore, if the plurality of personal information management apparatuses (personal agents) are independently used, it is necessary to separately use an information terminal for each personal information management apparatus (personal agent). Thus, it is almost impossible to use the plurality of personal information management apparatuses (personal agents) through one information terminal.

Although the function of communications among a plurality of personal information management apparatuses (personal agents) can be realized as the information terminal device disclosed by Japanese Patent Publication No.2000-67118, a method of processing the personal information about the same person by dividing the information into groups for different situations has not been provided. Therefore, unless a user personally switches his or her situation, appropriate information cannot be selected from among plural pieces of personal information.

SUMMARY OF THE INVENTION

The present invention has been developed to solve the above mentioned problems, and aims at providing a personal information management apparatus and a personal information managing method capable of collectively managing personal information about different situations, a storage medium and program therefor.

The personal information management apparatus according to the present invention is a personal information management apparatus for electronically managing users' personal information, and includes a personal information database selection unit and a processing unit.

According to the first aspect of the present invention, the personal information database selection unit selects a personal information database based on predetermined rules from the personal information storage unit including a plurality of personal information databases respectively storing personal information about different situations of a user. The processing unit processes the personal information database selected by the personal information database selection unit such that the personal information can be read and written.

BRIEF DESCRIPTION OF THE DRAWINGS

FIG. 5 is a flowchart of the flow of operating process of the synchronous functions of detecting a change and synchronizing the contents;

FIG. 7 shows the function of a personal information management apparatus (personal agent) 300 shown in FIG. 6;

FIG. 9 shows the configuration of a personal information management apparatus.

DESCRIPTION OF THE PREFERRED EMBODIMENTS

Figure 1:
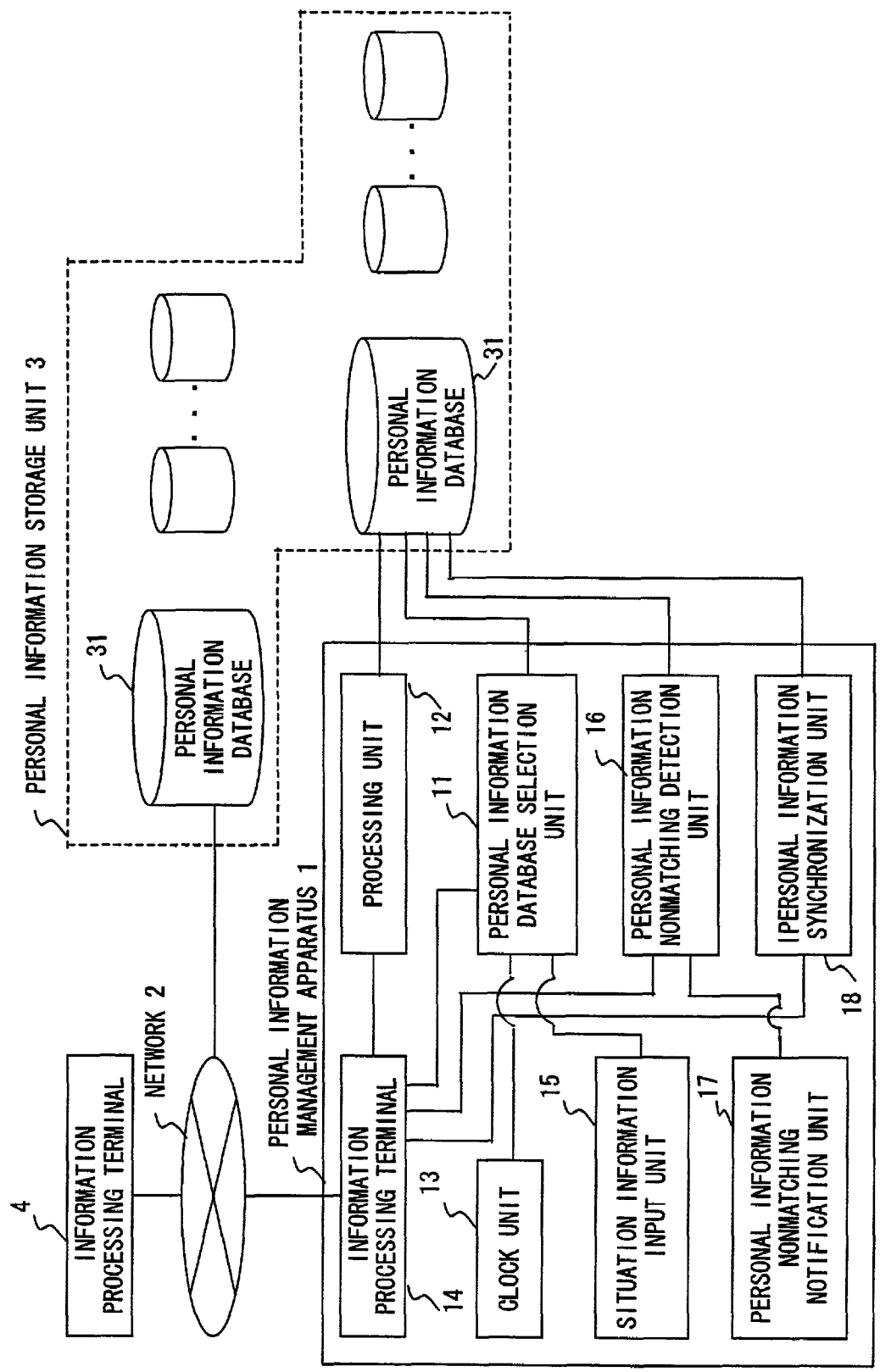
FIG. 1 shows the entire configuration for explanation of the personal information management apparatus and its vicinity to which the present invention is applied.

The embodiments of the present invention are described below in detail by referring to the attached drawings.

The present invention has the following configuration to solve the above mentioned problems.

The personal information management apparatus (personal agent) for managing users' electronic personal information is provided with the function of managing plural sets of personal information about different situations and the function of selecting and using the personal information based on the user-defined rules.

The rules for selection of user personal information in the personal information management apparatus (personal agent) are realized as the rules for selecting the personal information depending on the use time.

The rules for selection of user personal information in the personal information management apparatus (personal agent) are also realized as the rules for selecting the personal information depending on the path and method for access to the network of a user terminal.

The rules for selection of user personal information in the personal information management apparatus (personal agent) are also realized as the rules for selecting the personal information by referring to the personal information indicating the situation and status in the user personal information.

The function of managing plural sets of personal information managed by the above mentioned personal information management apparatus (personal agent) is realized using a plurality of personal information management apparatuses (personal agents) for respectively managing a set of personal information and an integration agent for integrally managing these personal information management apparatuses (personal agents).

Furthermore, the plural sets of personal information managed by the above mentioned personal information management apparatus (personal agent) depend on each other. When a part of one set of personal information is changed, another set of personal information specified by a user is also changed, which is referred to as a personal information synchronization function.

The personal information management apparatus (personal agent) is mounted in a server in a network, and manages the personal information by answering the request from a terminal.

Otherwise, the personal information management apparatus (personal agent) is mounted directly on a terminal of a user, and accesses other terminals and personal information management apparatuses (personal agents) through a network.

The personal information management apparatus (personal agent) is also provided with the function of synchronizing the information managed by the personal information management apparatuses (personal agents) of other users.

The personal information management apparatus (personal agent) can be used no an organization such as a division, department, or enterprise as well as an individual person.

That is, according to an aspect of the present invention, the personal information management apparatus according to the present invention electronically manages users' personal information, and comprises: a personal information database selection unit for selecting a personal information database based on a predetermined rules from a personal information storage unit containing a plurality of personal information databases respectively storing personal information about different situations of the same user; and a processing unit for processing the personal information database selected by the personal information database selection unit such that personal information can be read and written.

It is desired that the personal information management apparatus according to the present invention further comprises a clock unit for outputting the current time data so that the rules are defined based on the time data output by the clock unit.

It is also desired that the personal information management apparatus according to the present invention further comprises a transmission/reception unit provided in a network for transmitting and receiving data to and from a information processing terminal through the network so that the personal information database selection unit can select the personal information database through the network or directly select the personal information database.

It is further desired that the personal information management apparatus according to the present invention defines the rules based on the information received by the transmission/reception unit about the access path in the network from the information processing terminal.

It is further desired that the personal information management apparatus defines the rules according to the information which is received by the transmission/reception unit and designates the information processing terminal.

It is further desired that the personal information management apparatus according to the present invention comprises a status information input unit for inputting any user status information in the user status information containing the situation of a user and the status of a user, and the rules are defined according to the user status information input through the status information input unit.

It is further desired that the personal information management apparatus according to the present invention comprises: a personal information nonmatching detection unit for detecting that the personal information about predetermined items common to the two personal information databases stored in the personal information storage unit is different from each other; and a personal information nonmatching notification unit for informing of the difference detected by the personal information nonmatching detection unit.

It is further desired that the personal information management apparatus according to the present invention comprises a personal information synchronization unit for amending one piece of different personal information detected by the personal information nonmatching detection unit to match the other piece.

FIG. 1 shows the entire configuration for explanation of the personal information management apparatus according to the present invention and its vicinity.

In FIG. 1, a personal information management apparatus 1 is connected to an information processing terminal 4 through a network 2.

The personal information management apparatus 1 is also connected to a personal information database 31 through the network 2 or directly.

The personal information management apparatus 1 comprises a personal information database selection unit 11, a processing unit 12, a clock unit 13, a transmission/reception unit 14, a situation information input unit 15, a personal information nonmatching detection unit 16, a personal information nonmatching notification unit 17, and a personal information synchronization unit 18, and electronically manages the personal information of users.

The personal information database selection unit 11 selects the personal information database 31 based on predetermined rules from a personal information storage unit 3 provided with a plurality of personal information databases 31 which are stored for each situation and contain personal information about different situations of the same user.

The processing unit 12 processes the personal information database 31 selected by the personal information database selection unit 11 such that the personal information can be read and written.

The clock unit 13 outputs the current time data (information about year, month, day, minute, and second including holiday information such as a day of week, a national holiday, etc.). Based on the time data (day of week, working hours) output by the clock unit 13, the above mentioned rules can be defined. For example, if the time data '2:00 p.m. on Monday' is output, then a rule of an 'employee status' can be defined.

The transmission/reception unit 14 is installed in the network 2, and transmits and receives data to and from the information processing terminal 4 through the network 2. Then, the personal information database selection unit 11 not only directly selects the personal information database 31, but also selects the personal information database 31 through the network 2.

Furthermore, the rule can be defined based on the information received by the transmission/reception unit 14 about the access path in the network 2. For example, if it is an access path from a contract provider as a person (privately), then it can be defined as a rule of a private status. If it is an access path from a server of an office of the user, then it can be defined as a rule of an employee status.

The rule can also be defined according to the information which is received by the transmission/reception unit 14 and designates the information processing terminal 4. For example, if the information processing terminal 4 is a PC (personal computer), then the rule can be defined as a rule of an employee status, and if it is a personally owned PC, a rule of a private status can be defined.

The situation information input unit 15 inputs any user status information in the user status information containing the situation of a user and the status of the user. According to the user status information input through the situation information input unit 15, the rule can be defined. For example, according to the time recorder recording the entrance/exit information of the working information input from a time card recording the information recorded on the time recorder, the rule of an employee can be defined. Furthermore, according to the login information in the host computer of the contract provider of a person (privately), the rule of a private status can be defined.

The personal information nonmatching detection unit 16 detects that the personal information of predetermined items common to the two personal information databases 31 stored in the personal information storage unit 3 is different from each other.

The personal information nonmatching notification unit 17 informs of the difference detected by the personal information nonmatching detection unit 16.

The personal information synchronization unit 18 amends one piece of the different personal information detected by the personal information nonmatching detection unit 16 to match the other piece.

Figure 2:
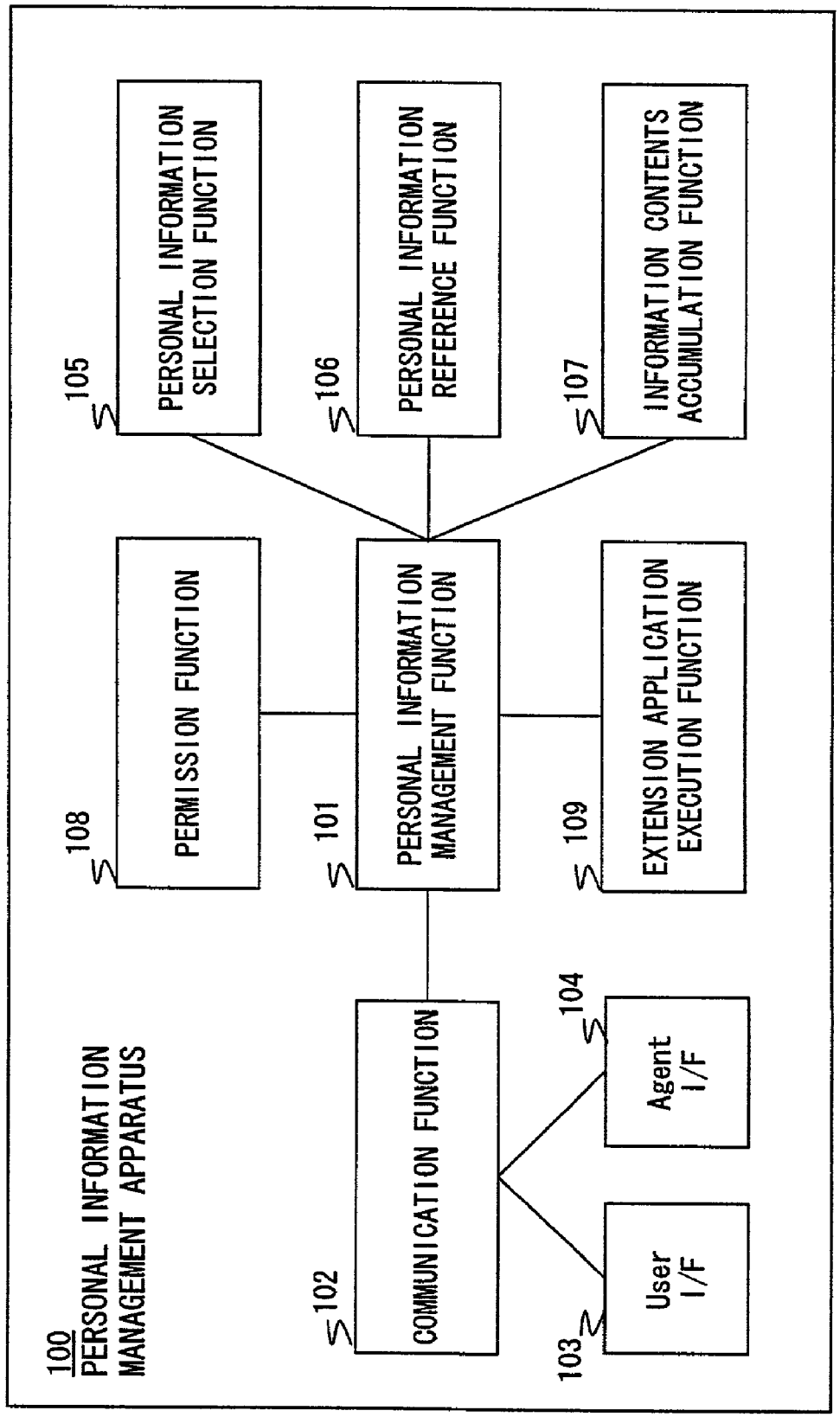
FIG. 2 shows the configuration of the function according to an embodiment of the personal information management apparatus (personal agent) to which the present invention is applied.

FIG. 2 shows the configuration of the function of the embodiment of the personal information management apparatus (personal agent) according to the present invention.

In FIG. 2, a personal information management apparatus (personal agent) 100 comprises a personal information management function 101, a communication function 102, a user I/F 103, an agent I/F 104, a personal information selection function 105, a personal information reference function 106, an information contents accumulation function 107, a permission management function 108, and an extension application execution function 109.

The personal information management function 101 manages and controls the personal information of a user using the personal information selection function 105, the personal information reference function 106, the information contents accumulation function 107, and the permission management function 108.

The personal information selection function 105 determines according to the user-specified rule which personal information the user is to access.

The personal information reference function 106 refers to the personal information of another personal information management apparatus (personal agent) using the communication function 102.

The information contents accumulation function 107 temporarily accumulates the information obtained by the personal information reference function 106.

The permission management function 108 determines whether or not a reference request from a user is acceptable.

The communication function 102 interprets various communications protocols when the personal information management apparatus (personal agent) communicates with a user and other personal information management apparatuses (personal agents), and issues a message to other functions such as the personal information management function 101, etc.

The user I/F 103 is an interface between a user and the personal information management apparatus (personal agent) 100.

The agent I/F 104 is an interface for access from other personal information management apparatuses (personal agents).

The extension application execution function 109 allows the personal information management apparatus (personal agent) 100 to perform a plug-in process. An example of a plug-in process is described later.

Figure 3:
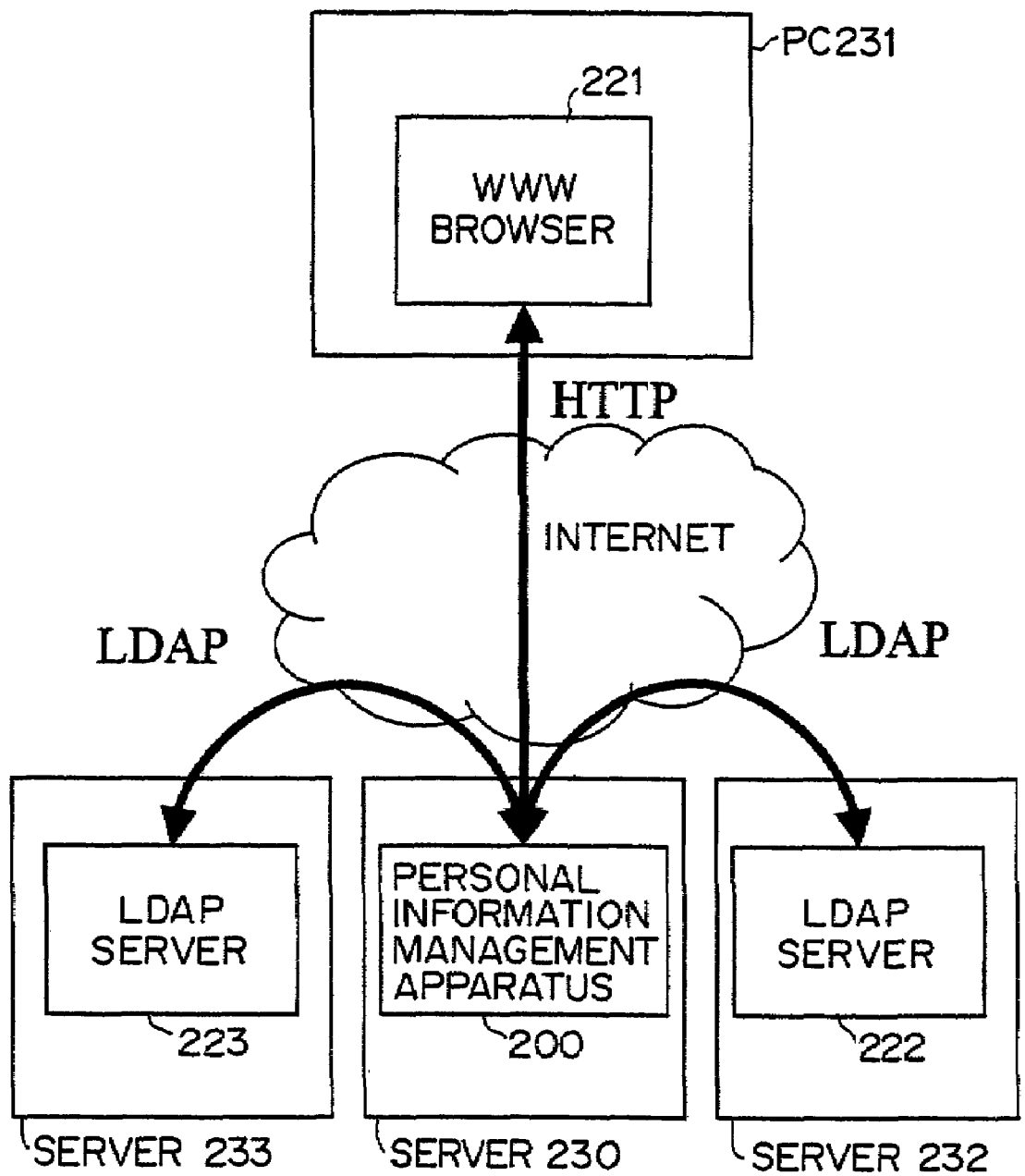
FIG. 3 shows the first embodiment of the personal information management apparatus (personal agent) according to the present invention.

FIG. 3 shows the first embodiment of the personal information management apparatus (personal agent) according to the present invention.

In FIG. 3, the personal information management apparatus (personal agent) 200 is operated in a server 230 through a network (Internet), and constantly waits for access of a user.

A WWW (World Wide Web) browser 221 is an application of a PC 231 used by a user, and accesses the WWW resources in the network (Internet) from the PC 231 connected to the network (Internet).

An LDAP (Lightweight Directory Access Protocol) server 222 and an LDAP server 223 are servers for managing users' personal information, and are operated by servers 232 and 233. They provide personal information for the applications gaining legal access using LDAPs.

The LDAP is configured by a server/client model, and defines a request-response message transfer protocol between a server (directory server) storing directory information and a client accessing it. The LDAP is defined by an RFC (Request For Comments) 1777 and an RFC 1778.

Figure 4:
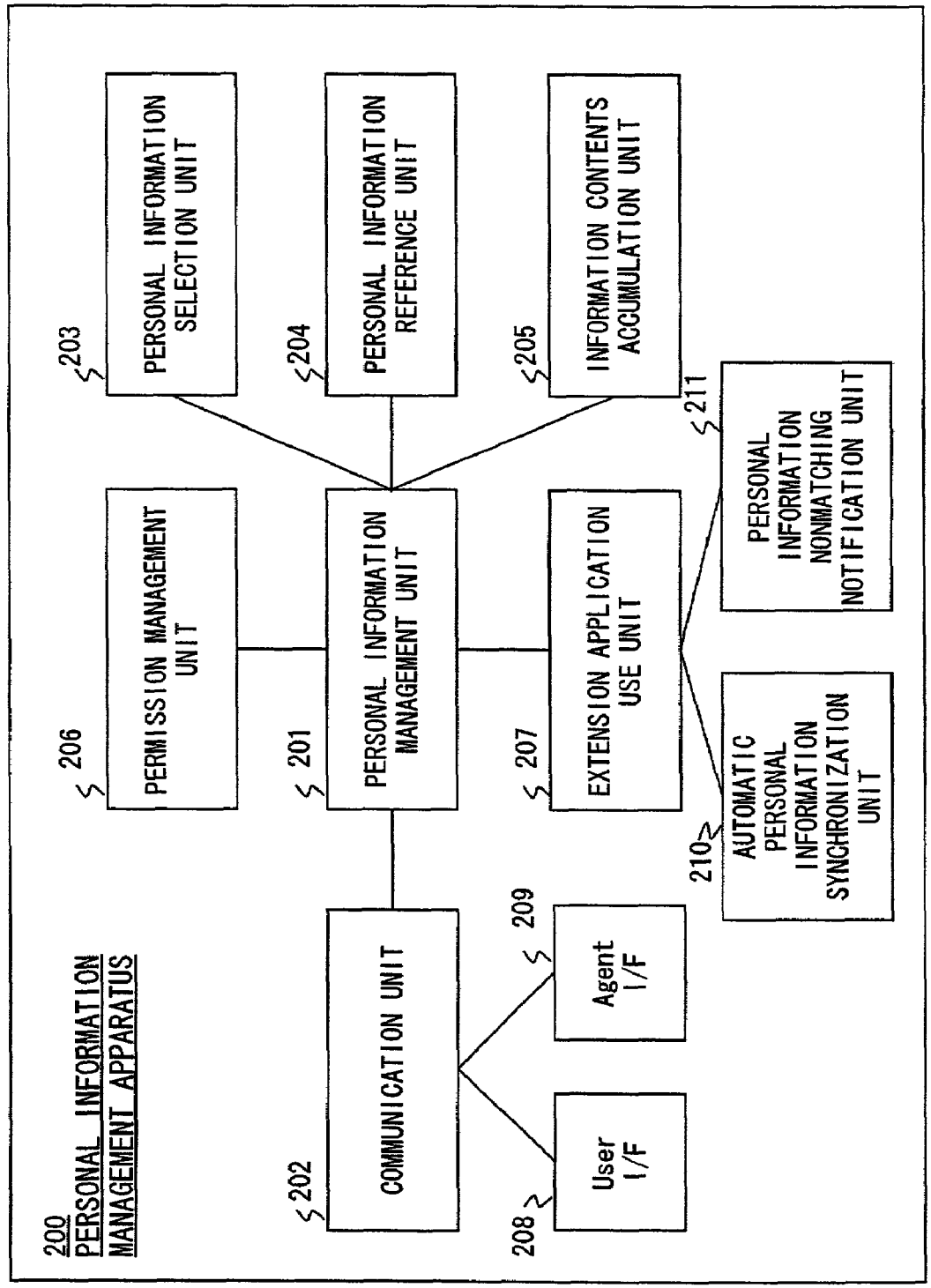
FIG. 4 shows the function of a personal information management apparatus (personal agent) 200 shown in FIG. 3.

Next, the function of the personal information management apparatus (personal agent) 200 shown in FIG. 3 is described by referring to FIG. 4.

In FIG. 4, the user using the personal information management apparatus (personal agent) 200 enters the rule for selection of his or her personal information in a personal information selection unit 203. The personal information selection unit 203 selects at least one appropriate set of plural sets of personal information (a plurality of personal information databases respectively storing personal information for each of the different points of the same user) according to the time, the access path to the network of the user, the working record in the personal information, etc. The rules for the selection are set by the user when he or she starts using the personal information management apparatus (personal agent) 200.

The personal information management apparatus (personal agent) 200 is to be devised to set the rules simply. For example, by using a network access path as a determination reference and allowing a user to input and set the mail address of the provider used personally or in his or her office, it is determined whether the user is accessing from his or her office or through his or her own contract provider. When it cannot be determined from the reference provided for the personal information management apparatus (personal agent) whether the user is accessing personally or on business, the user can separately specify the personal information to be prioritized.

The method of selecting the personal information can be used with various other determination references. For example, the public and private information can be determined based on the time, and the information can be switched depending on the working time and the holidays.

According to the embodiment of the present invention, the user can access the personal information management apparatus (personal agent) 200 through the HTTP and the SSL using the WWW browser. Therefore, a user I/F 208 is realized as the function of being invoked by the HTTP server and the CGI program.

Furthermore, according to the embodiment of the present invention, the plural sets of personal information are managed by separate LDAP servers. Therefore, an agent I/F 209 has a function as an LDAP client.

A personal information reference unit 204 obtains the personal information selected by the personal information selection unit 203 from the LDAP server 222 (FIG. 3) or the LDAP server 223 (FIG. 3) using the agent I/F 209. The referenced information can be accumulated in an information contents accumulation unit 205 for use. The information can be used as the latest information within a time shorter enough than the user information update intervals without asking the source DAP server. In this case, if the user notices that the information in the information contents accumulation unit 205 is too old, it is desired that an explicit instruction can be issued to the personal information reference unit 204 to obtain the latest information.

The personal information management apparatus aims at collectively managing personal information and reducing the load of a user. Therefore, it is desired that a plurality of personal information management apparatuses (personal agents) capable of accessing LDAP servers can automatically amend the inconsistency of data and give instructions to users. The synchronizing function of automatically amending the inconsistency and the function of notifying the users of the inconsistency can be realized as additional functions through an extension application use unit 207.

In the embodiment described by referring to FIG. 4, when a user first uses the personal information management apparatus (personal agent) 200, the user specifies the data having the same contents as target synchronous data in the data stored in the LDAP servers 222 and 223 (FIG. 3). For example, the name, age, etc. of a user are specified. The personal information management apparatus (personal agent) 200 monitors a change in the user-specified target synchronous data when the data of both servers (LDAP servers 222 and 223) is obtained.

There are several methods of detecting a change in data. In the embodiment of the present invention, the target synchronous data is to be stored in the information contents accumulation unit 205, and is to be prioritized more than the data in the LDAP servers 222 and 223. The user changes the personal information only through the personal information management apparatus (personal agent) 200. The personal information management apparatus (personal agent) 200 performs a data updating operation such that the data in the LDAP servers 222 and 223 can be the latest data at the timing of shown in the flowchart in FIG. 5. On the other hand, the data stored in the LDAP servers 222 and 223 is prioritized more than the data which is not target synchronous data. The values obtained from the LDAP servers 222 and 223 are stored in the information contents accumulation unit 205, and are used as cache information for a predetermined time so that the number of times of communications can be reduced.

FIG. 5 is a flowchart showing the flow of the operation of the function of detecting a change and synchronizing the contents.

In step S51, when a request to obtain the information about the target synchronous data is received from a user, it is determined in step S52 whether or not the requested data is set as target synchronous data.

If it is determined in step S52 that the data is target synchronous data (YES in step S52), then the information stored in the target LDAP server is received in step S53, and is compared with the data contents accumulated in the information contents accumulation unit 205 in step S54.

If it is not determined in step S54 that they match each other (NO in step S54), that is, if the data contents are too old, a request to change the information is transmitted to a target synchronous server in step S55. Then, in step S59, the user is notified of the contents stored in the information contents accumulation unit 205, thereby terminating the process.

On the other hand, if it is determined in step S52 that the information requested by the user is not a target synchronous data (NO in step S52), then it is determined in step S56 whether or not the stored data is older than the reference data. Since there is a possibility that the contents of the target data depends on the situation of the user, the information stored in the LDAP server is prioritized. To reduce the frequency of communications, control is passed to the information notification process, and the response time is shortened because there is the possibility that the information in the LDAP server has not been changed if the information stored as cache in the information contents accumulation unit 205 has been copied later than the reference retention period.

Therefore, if it is determined in step S56 that the data has not been updated after the reference retention period (YES in step S56), then the personal information management apparatus (personal agent) inquires the LDAP server of the latest information and obtains it in step S57, and the information is copied to the information contents accumulation unit 205 in step S58. Then, in step S59, the user is notified of the data contents.

The reference retention period is to be sufficiently shorter than the information update frequency in the LDAP server. If the reference retention period is long, the personal information management apparatus (personal agent) continues notifying the user of its old copied information even after the information in the LDAP server has been updated. If the reference retention period is too short, then the communications to the LDAP server are frequently required to confirm the contents of the data for the LDAP server, thereby prolonging the response time to the user. It is desired that the reference retention period is longer than the information inquiry interval of the user, and shorter than the information update interval of the LDAP server.

To realize the non-matching notification function, the personal information management apparatus can allow the user to confirm the information before issuing an instruction to update information to the target synchronous LDAP server in step S55. In this case, the personal information management apparatus (personal agent) first obtains user permission, and transmits a request to update information. The user can set the personal information management apparatus (personal agent) such that the non-matching notification function can work only on important data.

Figure 6:
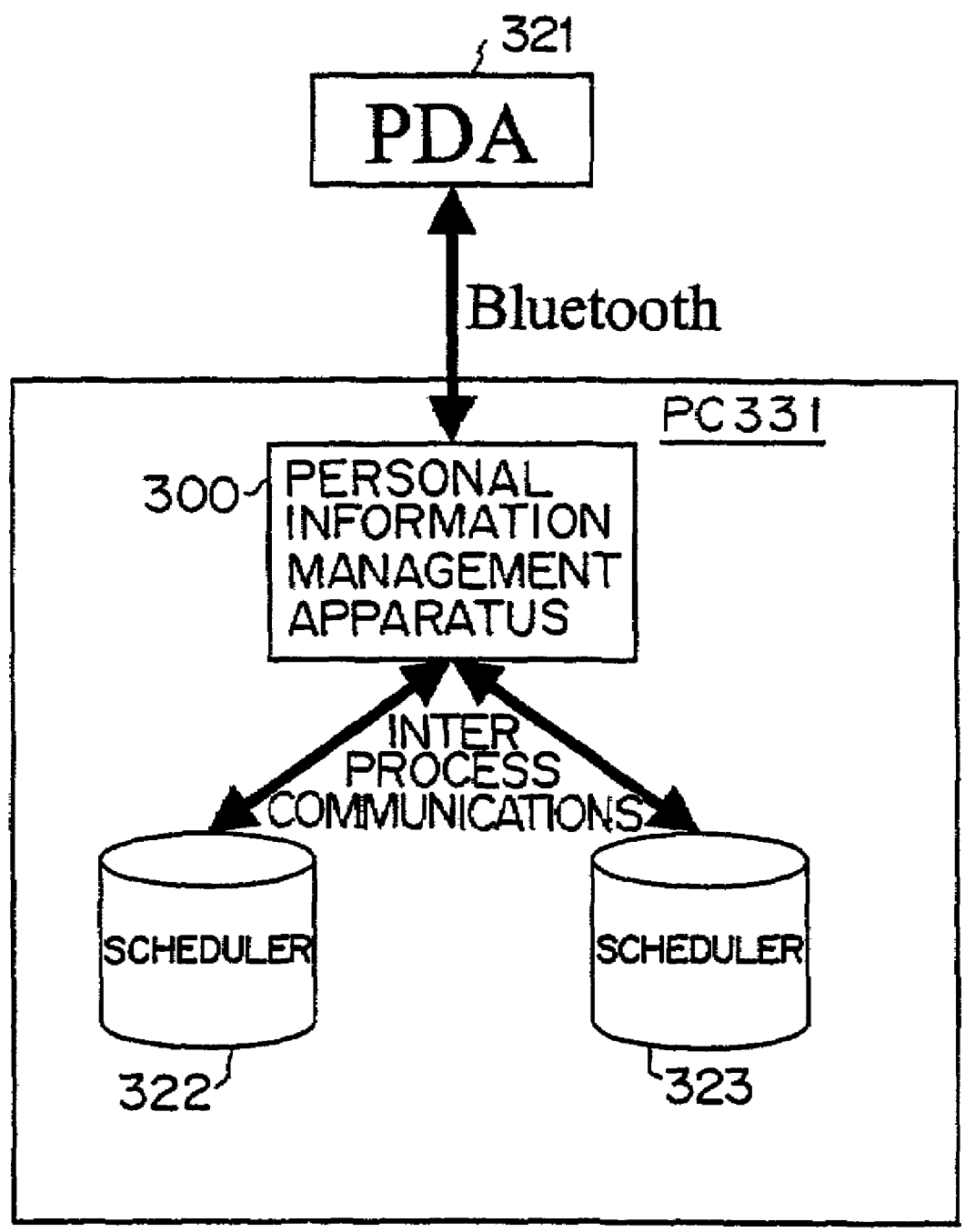
FIG. 6 shows the second embodiment of the personal information management apparatus (personal agent) according to the present invention.

FIG. 6 shows the second embodiment of the personal information management apparatus (personal agent) according to the present invention. FIG. 7 shows the function of the personal information management apparatus (personal agent) 300 shown in FIG. 6.

The function according to the second embodiment is similar to the function according to the first embodiment, but each function is realized by a different units (since each unit shown in FIG. 7 having the same name as the unit shown in FIG. 2 also has the same function, the detailed explanation is omitted here).

The personal information management apparatus (personal agent) 300 according to the present embodiment is directly mounted in the terminal of the user. Therefore, not only the personal information management apparatus (personal agent) in the network, but also the information terminal connected through a communications device such as a serial port, etc. is also a communications target. Furthermore, the subject which manages each piece of personal information is not a personal information management apparatus (personal agent) in a network such as an LDAP server, but is a schedule management application (scheduler) in a terminal. Therefore, information is obtained and updated in the inter-process communications using a signal. An agent I/F 309 is provided for the communications method.

According to the present embodiment, a user accesses the personal information management apparatus (personal agent) 300 through the PDA 301. The user uses the personal information management apparatus (personal agent) 300 as a synchronizing application of the PDA 301.

The PDA 301 is a portable terminal loaded with an existing pocket PC and a palm OS, and obtains backup data and installs a new application based on a large-scale information terminal such as a personal computer, etc. According to the present embodiment, data synchronization is perform with other applications through the personal information management apparatus (personal agent) 300.

Each piece of personal information is changed when an application is used in the PC 331 and data is input by the PDA 301. The personal information management apparatus (personal agent) 300 manages schedulers 322 and 323, selects an appropriate scheduler when the user obtains schedule information, and notifies the user of the contents of the data.

Furthermore, when the PDA 301 tries to synchronize with the PC 331, the contents of the data of a PDA 321 are changed based on the contents of the appropriate schedule in the situation. Relating to the selection reference, the time and the connecting method to a network can be used as in the first embodiment.

Figure 8:
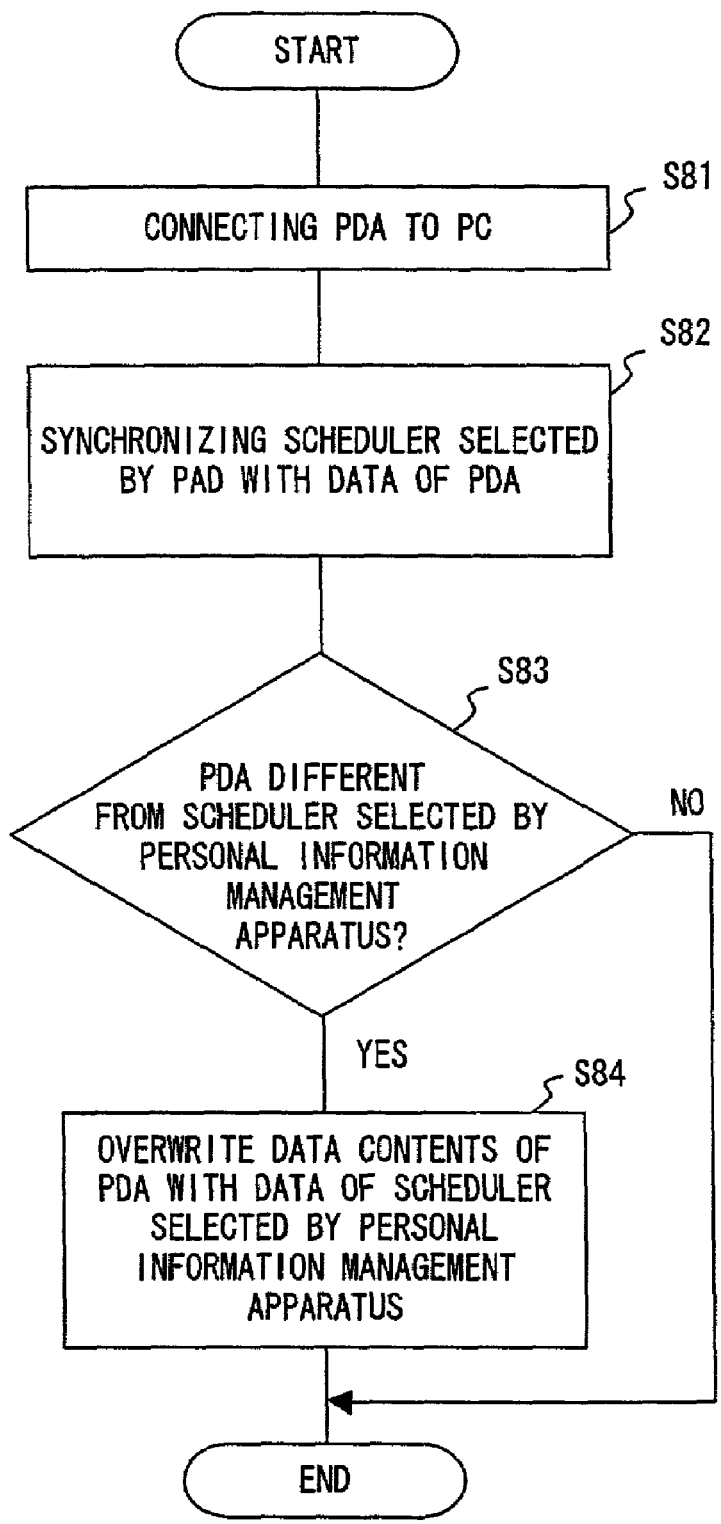
FIG. 8 is a flowchart of the operating process according to the second embodiment when a PC 331 and a PDA 301 are connected and synchronized.

FIG. 8 is a flowchart of the operation of the second embodiment when the PC 331 and PDA 301 are connected for synchronization.

First, When t he PC 331 and the PDA 301 are connected in step S81, the scheduler selected by the PDA 301 is synchronized with the data of the PDA 301 in step S87, and it is checked in step S88 whether or not the scheduler selected by the personal information management apparatus (personal agent) 300 is the same as the scheduler set as a reference scheduler by the PDA 301.

If it is determined in step S83 that they are the same (NO in step S83), then a different point is reflected by both schedulers as in the synchronization of the normal PDA and the scheduler, thereby terminating the synchronization.

On the other hand, if it is determined in step S83 that the PDA 301 is different from the scheduler selected by the personal information management apparatus (personal agent) 300 (YES in step S83), then the personal information management apparatus (personal agent) 300 changes the contents of the data of the PDA 301 into the data with an appropriate scheduler set as a reference scheduler. However, since the PDA 301 has changed the contents of the scheduler selected by itself, it synchronizes the scheduler selected by the PDA to store the update information (refer to step S82). In step S84, the contents of the data of the PDA 301 are cleared, and the contents of the scheduler selected by the personal information management apparatus (personal agent) 300 are overwritten.

Thus, using the second embodiment of the personal information management apparatus (personal agent) as the synchronization program in the conventional PDA appliances, the contents of the PDA can be changed into the contents based on the situation of the user.

When plural sets of personal information about different situations of the same use are separately used, the user has trouble in managing to switch the plurality of situations using the synchronization functions for conventional individual pieces of information. According to the personal information management apparatus (personal agent) of the present invention, a personal information management apparatus (personal agent) automatically selects the situation based on the settings of the user and presents the result to the user, thereby easily managing the information about a plurality of situations.

As described above, the embodiments of the present invention have been described by referring to the attached drawings. However, the personal information management apparatus according to the present invention is not limited to the above mentioned embodiments so far as the function can be realized. That is, the apparatus can be a device of a single unit, a system or an integrated device formed by a plurality of devices, or a system for performing a process through a network such as a LAN, WAN, etc.

As shown in FIG. 9, the present invention can also be realized by a system comprising a CPU 141, memory 142 such as ROM, RAM, etc., an input device 143, an output device 144, an external storage device 145, a medium drive device 147, a portable storage medium 146, and a network connection device 148 interconnected through a bus 140. That is, the present invention can also realized by providing the memory 142 such as ROM, RAM, etc. storing a program code of the software for realizing the system according to the above mentioned embodiments, the external storage device 145, and the portable storage medium 146 for the personal information management apparatus, and by the computer of the personal information management apparatus reading the program code.

In this case, the program code read from the portable storage medium 146, etc. is to realize a new function of the present invention, and the portable storage medium 146, etc. storing the program code is to configure the present invention.

The portable storage medium 146 for providing a program code can be, for example, a flexible disk, a hard disk, an optical disk, a magneto-optical disk, CD-ROM, CD-R, DVD-ROM, DVD-RAM, a magnetic tape, a non-volatile memory card, a ROM card, various storage media recording data through the network connection device 148 (that is, a communications line) such as electronic mail, personal computer communications, etc.

Figure 10:
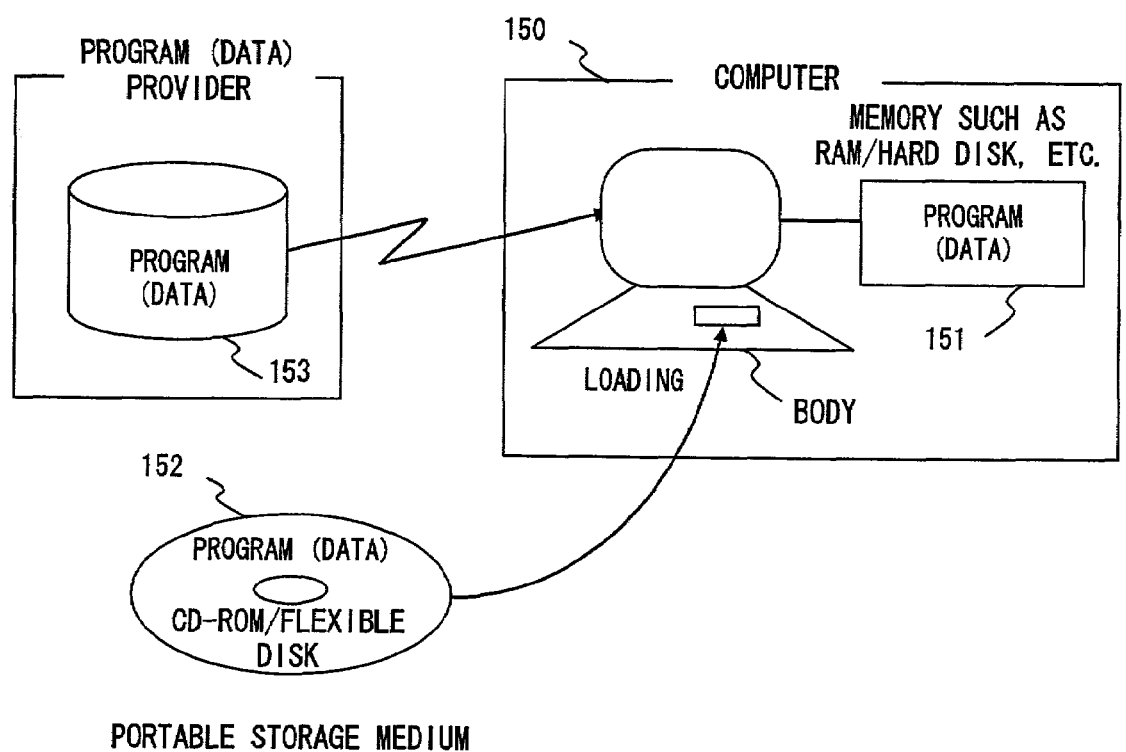
FIG. 10 shows the process of loading a program according to the present invention into a computer.

Furthermore, as shown in FIG. 10, the functions of the above mentioned embodiments can be realized by executing a program code read by a computer 150 to memory 151, and an OS, etc. operating in the computer 150 performs all or a part of an actual process, and the process can realize the functions of the above mentioned embodiments.

In addition, after a program code read from a portable storage medium 152 or a program (data) 153 provided by a program (data) provider is written to the memory 151 provided in a function extension board inserted into the computer 150 or the function extension unit connected to the computer 150, the CPU, etc. provided in the function extension board or the function extension unit performs all or a part of an actual process at an instruction of the program board, and the process can also realize the above mentioned embodiment of the present invention.

That is, the present invention is not limited to the above mentioned embodiments, but can be configured or formed within the scope of the gist of the present invention.

The following effect can be obtained using the personal information management apparatus according to the present invention.

That is, the personal information management apparatus (personal agent) has the function of managing plural sets of personal information about different situations of the same user, and the function of selecting personal information based on the above mentioned personal information based on the user-specified rules. As a result, the user can easily and collectively manage the personal information about different situations of the user.

Furthermore, the personal information management apparatus (personal agent) according to the present invention can select a rule based on which the personal information of a user can be selected from among: a rule of selecting the personal information depending on the using time; a rule of selecting the personal information depending on the path and method of accessing the network of the user terminal; a rule of selecting the personal information by referring to the personal information indicating the situation and status of the user personal information, etc. Therefore, the user can easily and almost unconsciously select the personal information in various situations.

The personal information management apparatus (personal agent) according to the present invention has a plurality of personal information management apparatuses (personal agents) for management of one set of personal information, and an integral personal information management apparatus (personal agent) integrally manages the personal information management apparatuses (personal agents). Therefore, the resources of the conventional personal information management apparatus (personal agent) can be used as is, thereby omitting the installing step.

In the personal information management apparatus (personal agent), plural sets of personal information depend on each other. When a part of a set of personal information is changed, another set of personal information specified by the user can also be changed. The personal information synchronization function easily realizes collective management of personal information stored in a plurality of terminals.

Furthermore, the personal information management apparatus (personal agent) is provided in a server in a network, and the personal information can be managed by answering a request from a terminal. Therefore, the personal information among a plurality of terminals can be more easily and collectively managed.

Since the personal information management apparatus (personal agent) according to the present invention is directly provided for the terminal of the user, and access other terminals and personal information management apparatuses (personal agents), plural sets of personal information stored in a plurality of terminals can be easily and collectively managed almost unconsciously as to whether or not the terminal is connected to the network.

What is claimed is:

1. A personal information management apparatus which electronically manages personal information of a user, comprising:

a personal information database selection unit selecting a personal information database based on rules from a personal information storage unit including a plurality of personal information databases respectively storing personal information regarding potential alternative situations of the same user;

a processing unit processing the personal information database selected by said personal information database selection unit, such that the personal information can be read and written;

a memory storing the rules referenced for selecting the appropriate personal information database, which are set by the same user in advance upon starting a use of the personal information management apparatus;

a clock unit outputting current time data, wherein said rules are defined based on the time data output by said clock unit;

a personal information nonmatching detection unit detecting a difference in personal information of predetermined items common to two personal information databases stored in said personal information storage unit;

a personal information nonmatching notification unit notifying of the difference detected by said personal information nonmatching detection unit; and a personal information synchronization unit amending one piece of different personal information detected by said personal information nonmatching detection unit to match the other piece.

2. The apparatus according to claim 1, further comprising a transmission and reception unit, provided in a network, transmitting and receiving data to and from an information processing terminal through the network, wherein said personal information database selection unit selects the personal information database through the network, or directly selects the personal information database.

3. The apparatus according to claim 2, wherein said rules are defined based on information received by said transmission and reception unit about access path in the network from the information processing terminal.

4. The apparatus according to claim 2, wherein said rules are defined based on information received by said transmission and reception unit and designating the information processing terminal.

5. The apparatus according to claim 1, further comprising a status information input unit inputting user status information comprising a situation of the same user and a status of the same user, wherein said rules are defined according to user status information input through said status information input unit.

6. The apparatus according to claim 1, further comprising:

a personal information nonmatching detection unit detecting a difference in personal information of predetermined items common to two personal information databases stored in said personal information storage unit; and a personal information synchronization unit amending one piece of different personal information detected by said personal information nonmatching detection unit to match the other piece.

7. The apparatus of claim 1 wherein the plurality of personal information databases are of the same hierarchical level, include the same set of data fields, and are different only with respect to the stored personal information.

8. A personal information managing method which electronically manages personal information of a user, comprising:

setting rules, for selecting personal information databases, by the same user in advance upon starting a use of a personal information management apparatus;

retaining the rules in a memory;

selecting a personal information database based on the rules from a personal information storage unit including a plurality of personal information databases respectively storing personal information regarding potential alternative situations of the same user;

processing the selected personal information database such that the personal information can be read and written;

outputting current time data, wherein the rules are defined based on the output time data;

detecting a difference in personal information of predetermined items common to two personal information databases stored in said personal information storage unit;

notifying of the detected difference; and amending one piece of the detected different personal information to match the other piece.

9. The method according to claim 8, further comprising:

transmitting and receiving data to and from an information processing terminal through a network;

wherein the personal information database is selected through the network, or the personal information database is directly selected.

10. The method according to claim 9, the rules are defined based on received information about an access path in the network from the information processing terminal.

11. The method according to claim 9, the rules are defined based on received information designating the information processing terminal.

12. The method according to claim 8, further comprising:

inputting user status information comprising a situation of a the same user and a status of the same user, wherein said rules are defined according to the input user status information.

13. The method according to claim 8, further comprising:

detecting a difference in personal information of predetermined items common to two personal information databases stored in said personal information storage unit; and amending one piece of the detected different personal information to match the other piece.

14. The method of claim 8, wherein the plurality of personal information databases are of the same hierarchical level, include the same set of data fields, and are different only with respect to the stored personal information.

15. A computer-readable storage medium storing a personal information management program used to direct a computer for electronically managing personal information of a user, by:

setting rules, for selecting personal information databases, by the same user in advance upon starting a use of a personal information management apparatus;

retaining the rules in a memory;

selecting a personal information database based on the rules from a personal information storage unit including a plurality of personal information databases respectively storing personal information about different situations of the same user;

processing the selected personal information database such that the personal information can be read and written;

outputting current time data, wherein said rules are defined based on the output time data;

detecting a difference in personal information of predetermined items common to two personal information databases stored in said personal information storage unit, wherein said detected difference is notified of; and amending one piece of the detected different personal information to match the other piece.

16. The storage medium according to claim 15, further comprising transmitting and receiving data to and from an information processing terminal through a network, wherein data is transmitted and received to and from an information processing terminal through a network; and said personal information database is selected through the network, or said personal information database is directly selected.

17. The storage medium according to claim 16, wherein said rules are defined based on received information about an access path in the network from the information processing terminal.

18. The storage medium according to claim 16, wherein said rules are defined based on received information designating the information processing terminal.

19. The storage medium according to claim 15, further comprising inputting user status information comprising a situation of the same user and a status of the same user, wherein said rules are defined according to the input user status information.

20. The storage medium to claim 19, further comprising:
detecting a difference in personal information of predetermined items common to two personal information databases stored in said personal information storage unit; and
amending one piece of the detected different personal information to match the other piece.

21. The medium of claim 15, wherein the plurality of personal information databases are of the same hierarchical level, include the same set of data fields, and are different only with respect to the stored personal information.

22. A personal information management program used to direct a computer for electronically managing personal information of a user by:
setting rules, for selecting personal information databases, by the same user in advance upon starting a use of a personal information management apparatus;
retaining the rules in a memory;
selecting a personal information database based on the rules from a personal information storage unit including a plurality of personal information databases respectively storing personal information regarding potential alternative situations of the same user;
processing the selected personal information database such that the personal information can be read and written;
outputting current time data, wherein said rules are defined based on the output time data;
detecting a difference in personal information of predetermined items common to two personal information databases stored in said personal information storage unit,
wherein said detected difference is notified of; and
amending one piece of the detected different personal information to match the other piece.

23. The program according to claim 22, further comprising transmitting and receiving data to and from an information processing terminal through a network,
wherein data is transmitted and received to and from an information processing terminal through a network, and said personal information database is selected through the network, or said personal information database is directly selected.

24. The program according to claim 23, wherein said rules are defined based on received information about an access path in the network from the information processing terminal.

25. The program according to claim 23, wherein said rules are defined based on received information designating the information processing terminal.

26. The program according to claim 22, further comprising inputting user status information comprising a situation of the same user and a status of the same user, wherein said rules are defined according to the input user status information.

27. The program according to claim 22, further comprising:
detecting a difference in personal information Qf predetermined items common to two personal information databases stored in said personal information storage unit; and
amending one piece of the detected different personal information to match the other piece.

28. The program of claim 22 wherein the plurality of personal information databases are of the same hierarchical level, include the same set of data fields, and are different only with respect to the stored personal information.

29. A personal information management apparatus which electronically manages personal information of a user, comprising:
setting means for setting rules for selecting personal information databases by the same user in advance upon starting a use of a personal information management apparatus and storing the set rules;
personal information database selection means for selecting a personal information database based on the rules from personal information storage means including a plurality of personal information databases respectively storing personal information regarding potential alternative situations of the same user;
processing means for processing the personal information database selected by said personal information database selection means such that the personal information can be read and written;
outputting means for outputting current time data, wherein said rules are defined based on the output time data;
detecting means for detecting a difference in personal information of predetermined items common to two personal information databases, wherein said detected difference is notified of; and
amending means for amending one piece of the detected different personal information to match the other piece.

30. The apparatus of claim 29, wherein the plurality of personal information databases are of the same hierarchical level, include the same set of data fields, and are different only with respect to the stored personal information.

31. A personal information managing method which electronically manages personal information of a user, comprising:
setting rules used in selecting one of a plurality of personal information databases, the rules based on potential alternative situations of the same user;
selecting the one of the plurality of personal information databases based on the set rules upon starting the computer;
outputting current time data, wherein said rules are defined based on the output time data;
detecting a difference in personal information of predetermined items common to the personal information databases, wherein said detected difference is notified of; and
amending one piece of the detected different personal information to match the other piece.

32. The apparatus of claim 31, wherein the plurality of personal information databases are of the same hierarchical level, include the same set of data fields, and are different only with respect to stored personal information.

33. A method of operating a data processing system, comprising:

receiving personal information from a user;
storing the user's personal information;
receiving a communication from the user comprising a request to access the user's stored personal information;
detecting the time of the communication;
limiting the user's access to the user's stored personal information according to the detected time of the communication;
detecting a difference in personal information of predetermined items common to two personal information databases included in said user's stored personal information, wherein said detected difference is notified of; and
amending one piece of the detected different personal information to match the other piece.

34. The method of claim 33, wherein the characteristic detected is the access path to the network where the communication was initiated.

35. The method of claim 33, wherein the characteristic detected is the type of terminal used to initiate the communication.

36. The method of claim 33, wherein the limiting restricts the user's access to personal information stored in one of a plurality of databases.

37. The method of claim 33, wherein the limiting restricts the user's access to personal information stored in one of a plurality of servers.

* * * * *

UNITED STATES PATENT AND TRADEMARK OFFICE
CERTIFICATE OF CORRECTION

PATENT NO. : 7,092,944 B2  
APPLICATION NO. : 10/000088  
DATED : August 15, 2006  
INVENTOR(S) : Shigeki Fukuta et al.

It is certified that error appears in the above-identified patent and that said Letters Patent is hereby corrected as shown below:

Column 13, Line 43, after "claim 1" insert --,--.

Column 14, Line 19, delete "a" before "the same user".

Column 15, Line 5, change "mediumaccording" to --medium according --.

Column 15, Line 13, "claim 19," should be --claim 15,--.

Column 16, Line 5, "Qf" should be --of--.

Column 16, Line 11, after "claim 22" insert --,--.

Column 16, Line 51, after "selecting" delete "the".

Signed and Sealed this

Second Day of January, 2007

JON W. DUDAS  
*Director of the United States Patent and Trademark Office*